United States Patent
Dan et al.

(10) Patent No.: US 12,362,969 B2
(45) Date of Patent: Jul. 15, 2025

(54) MULTIPLE-ACCESS CONSTANT ENVELOPE ORTHOGONAL FREQUENCY DIVISION MULTIPLEXING METHOD AND SYSTEM

(71) Applicant: Univ. Electronic Science and Technology of China, Chengdu (CN)

(72) Inventors: Lilin Dan, Chengdu (CN); Yuanjie Hu, Chengdu (CN); Haimeng Ji, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 92 days.

(21) Appl. No.: 18/517,215

(22) Filed: Nov. 22, 2023

(65) Prior Publication Data
US 2024/0106685 A1    Mar. 28, 2024

Related U.S. Application Data

(63) Continuation of application No. PCT/CN2023/096069, filed on May 24, 2023.

(30) Foreign Application Priority Data

Jul. 25, 2022  (CN) .......................... 202210874982.1

(51) Int. Cl.
*H04L 25/02* (2006.01)
*H04L 5/00* (2006.01)

(52) U.S. Cl.
CPC ........ *H04L 25/0268* (2013.01); *H04L 5/0007* (2013.01)

(58) Field of Classification Search
CPC ............... H04L 25/0268; H04L 5/0007; H04L 2025/03414; H04L 25/03159; H04L 27/2003; H04L 27/22; Y02D 30/70
(Continued)

(56) References Cited

U.S. PATENT DOCUMENTS

2012/0201331 A1*  8/2012  Lim .................. H04L 27/26524
                                                               375/295
2012/0224655 A1*  9/2012  Lim .................... H04L 27/2623
                                                               375/302
(Continued)

FOREIGN PATENT DOCUMENTS

CN      107426126 A     12/2017
CN      112866838 A      5/2021
(Continued)

OTHER PUBLICATIONS

International Search Report and Written Opinion, PCT/CN2023/096069; Sep. 14, 2023; China Intellectual Property Administration, Beijing, China; 8 pgs.

*Primary Examiner* — Emmanuel Bayard
(74) *Attorney, Agent, or Firm* — Andrew D. Fortney; Central California IP Group, P.C.

(57) ABSTRACT

A multiple-access constant envelope orthogonal frequency division multiplexing (OFDM) method and wireless communication system are disclosed. The method and system include a transmitter that sequentially processes the information and/or information bits of each user by digital modulation, symmetric mapping, frequency-domain to time-domain transformation, phase modulation, time-domain to frequency-domain transformation, frequency domain offsetting, frequency-domain to time-domain transformation, and cyclic prefix addition to obtain a baseband transmission signal, which is then sent to one or more receivers through a channel, and a receiver that sequentially processes the received signal by time-domain to frequency-domain transformation, user signal separation, equalization offsetting, frequency-domain to time-domain transformation, phase demodulation, another time-domain to frequency-domain transformation, demapping, and decision-making to obtain detection results for the corresponding user. The present (Continued)

method and system reduce data overlap between users and decrease inter-user interference by applying different phase rotations and/or different offsets to different users, thereby enhancing system performance.

18 Claims, 1 Drawing Sheet

(58) Field of Classification Search
USPC .................................................. 375/262, 295
See application file for complete search history.

(56) References Cited

U.S. PATENT DOCUMENTS

| | | | |
|---|---|---|---|
| 2013/0077714 A1* | 3/2013 | Lim | H04L 27/2636 375/302 |
| 2019/0044583 A1* | 2/2019 | Garcia | H04B 17/309 |
| 2020/0322009 A1* | 10/2020 | Upadhya | H04L 5/0044 |
| 2021/0281459 A1* | 9/2021 | Nakajima | H04L 1/0042 |

FOREIGN PATENT DOCUMENTS

| | | | |
|---|---|---|---|
| CN | 114157542 A | 3/2022 | |
| KR | 20130033947 A | 4/2013 | |

\* cited by examiner

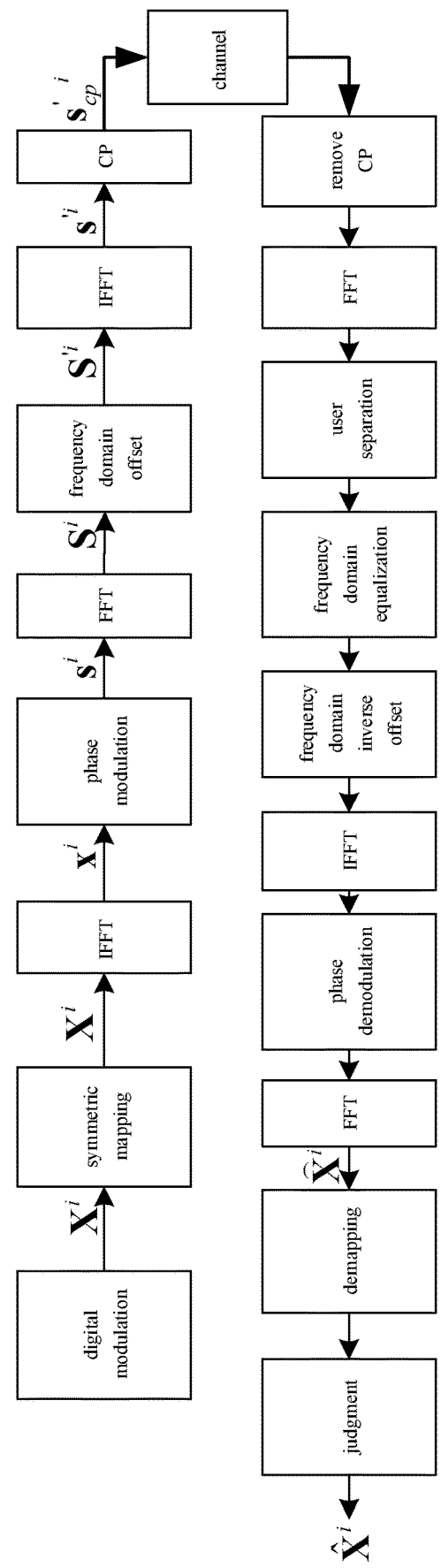

MULTIPLE-ACCESS CONSTANT ENVELOPE ORTHOGONAL FREQUENCY DIVISION MULTIPLEXING METHOD AND SYSTEM

CROSS-REFERENCE TO RELATED APPLICATIONS

This application is a continuation of International Pat. Appl. No. PCT/CN2023/096069, filed on May 24, 2023, which claims priority to Chinese Pat. Appl. No. 202210874982.1, filed on Jul. 25, 2022, the contents of each of which are incorporated by reference herein in their entireties.

FIELD OF THE INVENTION

The present invention belongs to the field of wireless communication technology and relates to a multiple access method based on Constant Envelope Orthogonal Frequency Division Multiplexing (CE-OFDM) with phase rotation.

DISCUSSION OF THE BACKGROUND

Orthogonal Frequency Division Multiple Access (OFDMA) combines OFDM and Frequency Division Multiple Access (FDMA) technology, which has good resistance to multipath effects and multiuser interference, and has become the physical layer multiple access scheme for wireless communication systems from 3rd generation to 5th generation mobile communication systems and physical layer multiple access schemes for wireless communication systems such as 3rd to 5th generation mobile communication and wireless LAN. However, the OFDMA system transmits signals with high a peak-to-average power ratio (PAPR) compared to single carrier waveforms, which in turn reduces the power utilization of power amplifiers and affects the effective coverage of wireless access networks, especially the uplink multiple access. To address the high PAPR problem of traditional OFDM waveforms, the CE-OFDM technique further modulates the OFDM time-domain symbols to the phase of the constant-envelope carrier signal through phase modulation to form a CE-OFDM baseband transmit waveform with 0 dB PAPR, which ensures the efficiency of the power amplifier.

Although phase modulation in CE-OFDM reduces the PAPR fluctuation of the transmitted signal, a nonlinear phase modulation process also destroys the orthogonality between subcarriers, causing subcarrier components to overlap with each other, and introduces inter-user interference, which leads to a degradation of system transmission performance.

SUMMARY OF THE INVENTION

Aiming at the problem of inter-user interference, the present invention proposes a novel multiple access method applicable to CE-OFDM. The method alleviates inter-user data overlapping and reduces inter-user interference by improving user carrier offset, which can effectively improve system transmission performance.

The present invention proposes a multi-access method with user carrier offset, where different users are rotated through different phases to reduce the mixing of subcarrier components of different users, reduce inter-user interference due to phase modulation, and realize subband frequency division multiplexing.

One technical solution of the present invention is:

A method of constant envelope orthogonal frequency division multiple access (CE-OFDMA) based on constant envelope orthogonal frequency division multiplexing for multi-user access, where the number of subcarriers in the method (or the system when the invention concerns a system) is N, the total number of users is U, and the oversampling factor is Q. Each user occupies a subset of the subcarriers $N^i=N/U$, and the effective subcarrier number (e.g., an effective number for the number of subcarriers) is $N_c=N^i/2$. An identifier for each of the users can be denoted as $i=1, 2, \ldots, U$. The characteristic of CE-OFDMA lies in the following steps performed by a transmitter and a receiver (e.g., in a wireless CE-OFDMA system) allowing multi-user access:

Step A: the transmitter generates and transmits the baseband transmission signal (e.g., as follows):

a1: A digital modulation module in the transmitter maps the information bits of a user i to M-ary QAM modulation symbols, resulting in a modulation signal $X^i$ of length $N_c$, where $X^i=[0, X^i(1), X^i(2), \ldots, X^i(N_c-1)]^T$, M is the number (or effective number) of digital or binary bits transmitted per symbol and/or per time interval, $X^i(q)$ represents the q-th symbol of the modulation signal $X^i$, and $q=1, \ldots, N_c-1$;

a2. A mapping module in the transmitter places (or maps) the modulation signal $X^i$ according to a preset conjugate symmetric format, resulting in a frequency-domain symbol $\tilde{X}^i$ of length $N_{FFT}=N \times Q$;

a3. A frequency-domain to time-domain transformation module in the transmitter generates a time-domain orthogonal frequency division multiplexing (OFDM) symbol $x^i$ for user i (e.g., among the users) by performing an inverse fast Fourier transform (IFFT) on the frequency-domain symbol $\tilde{X}^i$, wherein the IFFT transform includes a number of points $N_{FFT}$;

a4. A phase modulation module in the transmitter performs a phase modulation on the time-domain orthogonal frequency division multiplexing (OFDM) symbol $x^i$ of user i to obtain a discrete time-domain constant envelope OFDM (CE-OFDM) signal $s^i$, where the signal $s^i$ includes $N_{FFT}$ sampling points, and a signal $s^i[n]$ at the n-th sampling point is given by the formula $s^i[n]=Ae^{j\phi^i}$, where A is the carrier signal amplitude (e.g., an amplitude of a carrier signal), $\phi^i$ is a phase and $\phi^i=2\pi h C_N x^i[n]$, $2\pi h$ is a preset modulation index, $C_N$ is a normalization constant factor, and $x^i[n]$ is a signal at the n-th sampling point of the time-domain orthogonal frequency division multiplexing (OFDM) symbol $x^i$;

a5. A time-domain to frequency-domain transformation module in the transmitter performs a first $N_{FFT}$-point FFT transform on $s^i$ to generate a frequency-domain signal $S^i$ for the user i;

a6. A frequency-domain shifting module in the transmitter shifts (e.g., to the right) the signal $S^i$ by $NS^i$ subcarriers to obtain a signal $S'^i$, where $NS^i$ is related to (e.g., a result of a mathematical operation performed on) the subset of the subcarriers $N^i$ and the user identifier i (for example, $NS^i=N^i(i-1)$). Thus, the system may include a receiver that comprises a mathematical operator configured to perform a mathematical operation on the subset of the subcarriers $N^i$ and the user identifier i to obtain $NS^i$, and the mathematical operator may comprise (i) an adder or subtractor configured to reduce the user identifier i by 1, and (ii) a multiplier configured to multiply the subcarriers $N^i$ by the user identifier i minus 1.

a7. The frequency-domain to time-domain transformation module in the transmitter performs an $N_{FFT}$-point IFFT transform on the signal $S'^i$ to obtain a time-domain signal $s'^i$; and a8. A cyclic prefix module in the transmitter adds a cyclic prefix of length $N_{CP}$ to the time-domain signal $s'^i$, resulting in a baseband transmission signal $s'^i_{cp}$; and Step B: The receiver receives a signal (e.g., a transmitted wireless signal) through or from a channel (e.g., of the CE-OFDMA system) and processes the signal to obtain detection results of or for each user, including:

b1. A time-domain to frequency-domain transformation module in the receiver processes the signal by removing a cyclic prefix, then performs a second $N_{FFT}$-point FFT transform to obtain a frequency-domain received signal Y;

b2. A user separation module in the receiver separates the frequency-domain received signal Y to obtain a signal $Y^i$ for each user;

b3. An equalization offset module in the receiver equalizes the signal $Y^i$ (e.g., processes the signal $Y^i$ by equalization) to obtain an equalized symbol $\overline{Y}^i$, and then left-shifts the equalized symbol $\overline{Y}^i$ by $NS^i$ subcarriers to obtain a symbol $\tilde{Y}^i$;

b4. A phase adjustment module in the receiver performs phase demodulation (e.g., to obtain a phase-demodulated symbol). Then, a time-domain to frequency-domain transformation module in the receiver processes the phase-demodulated symbol by an FFT transform to obtain data $\hat{X}^i$ (e.g., in a time domain);

b5. A demapping module in the receiver demaps the data $\hat{X}^i$ to obtain effective data $\tilde{X}^i$ for the user i. Then, a decision module in the receiver makes a decision on the effective data $\tilde{X}^i$ to obtain one of the detection results (e.g., a detection result $\hat{X}^i$) for user i. For example, the decision may refer to maximum likelihood (ML) detection for the received signal, or selection of a likely (or the most likely) bit/symbol sequence for the received signal based on phase detection. Methods and circuitry for performing such decision-making are known to those skilled in the art.

In step a2, the frequency-domain symbol $\tilde{X}^i$ may be specifically defined as:

$$\tilde{X}^i = [0, X^i(1), X^i(2), \ldots, X^i(N_c-1), 0_{1 \times (N/2-N_c)}, 0_{1 \times N_{zp}}, 0, 0_{1 \times (N/2-N_c)}, X^{i*}(N_c-1), \ldots, X^{i*}(2), X^{i*}(1)]^T$$

where $N_{zp} = N(Q-1)$, an asterisk (*) denotes a complex conjugate (e.g., if x=a+bj, then x*=a−bj, where a and b are the real and imaginary parts of x, respectively), and $0_{1 \times N}$ represents a zero vector of size 1×N.

In one or more embodiments, in step a4, the normalization constant factor $C_N = \sqrt{N_{FFT}^2/[(N-2)\sigma_I^2]}$, where $\sigma_I^2 = 2(M-1)/3$, and M represents an order of QAM modulation (e.g., the number of different symbols that can be transmitted and/or encoded using the CE-OFDMA system).

Further, in step a6, the expression for the signal $S'^i$ may be specifically defined as:

$$S'^i = \begin{cases} [S^i(1), \ldots, S^i(N_{FFT})]^T, & i = 1 \\ [S^i(N_{FFT}-NS^i+1), \ldots, S^i(N_{FFT}), \\ S^i(1), \ldots, S^i(N_{FFT}-NS^i)]^T, & 2 \leq i \leq U \end{cases}$$

where $S^i(j)$ represents the signal (e.g., the signal $S'^i$) at any arbitrary j-th sampling point (e.g., a given j-th sampling point) of the signal $S^i$.

Further, in step a8, the baseband transmission signal $s'^i_{cp}$ may be specifically defined as:

$$s'^i_{cp} = [s^i[N_{FFT}-N_{CP}+1], \ldots, s^i[N_{FFT}-1], s^i[0], s^i[1], \ldots, s^i[N_{FFT}-1]]^T$$

where $s^i[\bullet]$ represents the baseband transmission signal at any arbitrary sampling point (e.g., a given sampling point) of the baseband transmission signal $s'^i_{cp}$.

Further, in step b2, the signal $Y^i$ for the user i may be specifically defined as:

$$Y^i = \begin{cases} [Y(1), \ldots, Y(N_c), 0_{1 \times (N_{FFT}-N^i)}, \\ Y(N_{FFT}-N_c+1), \ldots, Y(N_{FFT})]^T, & i = 1 \\ [0_{1 \times N_c}, 0_{1 \times K_i}, Y(K_i+N_c+1), \ldots, \\ Y(K_{i+1}+N_c), 0_{1 \times (N_{FFT}-N_c-K_{i+1})}]^T, & 2 \leq i \leq U \end{cases}$$

where $0_{1 \times N}$ represents a zero vector of size 1×N, $Y(\bullet)$ represents the signal (e.g., the frequency-domain received signal Y) at any arbitrary sampling point (e.g., a given sampling point) of the frequency-domain received signal Y, and $K_i = (i-2)N^i$.

Further, in step b3, the symbol $\tilde{Y}^i$ may be represented as:

$$\tilde{Y}^i = \begin{cases} [\overline{Y}^i(1), \ldots, \overline{Y}^i(N_{FFT})]^T, & i = 1 \\ [\overline{Y}^i(NS^i+1), \ldots, \overline{Y}^i(N_{FFT}), \overline{Y}^i(1), \ldots, \overline{Y}^i(NS^i)], & 2 \leq i \leq U \end{cases}$$

where $\overline{Y}^i(\bullet)$ represents the symbol at any arbitrary sampling point (e.g., a given sampling point) of the equalized symbol $\overline{Y}^i$ for the user i.

One beneficial effect of the present invention is that in a CE-OFDMA system, different phase rotation by different users reduces data aliasing between users, reduces inter-user interference, and improves system performance.

BRIEF DESCRIPTION OF THE DRAWING

FIG. 1 shows a block diagram of an exemplary system and/or the functionality therein in accordance with the present invention.

DETAILED DESCRIPTION

In order to clarify the objectives, technical solutions, and advantages of the present invention, a detailed description of embodiments of the present invention will be given in conjunction with the accompanying drawing.

Example 1

In a first example, an uplink CE-OFDM system has a total number of subcarriers N=32, a total number of users U=2, and an oversampling factor Q=2, each user occupying $N_i = N/U = 16$ subcarriers and having $N_c = N_i/2 = 8$ effective subcarriers, where i=1, 2, and QPSK modulation is employed. As shown in FIG. 1, an exemplary embodiment of the present invention provides a method for multiple access in a constant envelope orthogonal frequency division multiplexing system, comprising the following. In the transmitter, the information bits of each user are, in sequence, digitally modulated, symmetrically mapped, transformed from the frequency domain to the time domain, phase-modulated, transformed from the time domain back to the frequency domain, offset in the frequency domain, and transformed from the frequency domain back to the time domain. A cyclic prefix is added to the processed information in the time domain to obtain the baseband transmission signal, which is then sent to the receiver via the channel. In the receiver, the cyclic prefix is removed from the signal received from the channel, and the resulting signal is sequentially processed by time-domain to frequency-domain transformation, user separation (e.g., separating the different signals for each user in the CE-OFDM system), equalization offset, frequency-domain to time-domain transformation, phase demodulation, time-domain to frequency-domain transformation, demapping, and decision-making to obtain the detection results (e.g., the information or information bits processed and transmitted by the transmitter) for the corresponding user.

To illustrate with User 2, the method of the embodiment of the present invention specifically includes the following:

In the transmitter:

Step 1, Digital Modulation: The transmitted bit sequence of User 2 is mapped to QPSK symbols, resulting in the modulation signal $X^{(2)} \in \mathbb{C}^{8 \times 1}$:

$$X^{(2)} = [0, 0.7+0.7j, 0.7+0.7j, -0.7-0.7j, 0.7+0.7j, 0.7-0.7j, -0.7-0.7j, -0.7-0.7j]^T$$

$$X^i = [0, X^i(1), X^i(2), \ldots, X^i(N_c-1)]^T$$

Step 2, Symmetric Mapping: $X^{(2)}$ is placed in a conjugate symmetric format as follows:

$$\tilde{X}^{(2)} = [0, 0.7+0.7j, \ldots, -0.7-0.7j, 0_{1 \times 49}, -0.7+0.7j, \ldots, 0.7-0.7j]^T$$

resulting in a frequency-domain symbol $\tilde{X}^{(2)} \in \mathbb{C}^{64 \times 1}$ with a length of $N_{FFT} = NQ = 64$. Different users may be mapped to different frequency domains.

Step 3, Frequency Domain to Time Domain Transformation: $\tilde{X}^{(2)}$ is transformed by an $N_{FFT} = 64$ IFFT to generate the OFDM symbol $x^{(2)} \in \mathbb{R}^{64 \times 1}$ in the time domain for the second user:

$$x^{(2)} = [0.021, 0.054, 0.082, \ldots, 0.009, -0.005, -0.001]^T$$

Step 4, Phase Modulation: The time-domain OFDM symbol $x^{(2)}$ for User 2 obtained above is phase-modulated to obtain the discrete-time CE-OFDM signal $s^{(2)} \in \mathbb{C}^{64 \times 1}$, where $A=1$, $2\pi h=0.7$ and the calculated values are $\sigma_I^2 = 2$ and $C_N = 8.2624$. Hence, $s^{(2)}$ is represented as:

$$s^{(2)} = [0.992+0.126j, 0.950+0.310j, 0.888+0.458j, \ldots, 0.998+0.055j, 0.999-0.315j, 1.00-0.007j]^T$$

Step 5, Time Domain to Frequency Domain Transformation: The signal $s^{(2)}$ is transformed by an $N_{FFT}=64$ point FFT to generate the frequency domain signal $S^{(2)} \in \mathbb{C}^{64 \times 1}$ for User 2, where $S^{(2)}$ is expressed as:

$$S^{(2)} = [7.56+0.019j, -0.472+0.615j, -0.446+0.446j, \ldots, -0.547-0.486j, 0.568+0.506j, 0.472+0.369j]^T$$

Step 6, Frequency Domain Offset: $S^{(2)}$ is shifted to the right by $NS^{(2)} = 16$ subcarriers to obtain $S'^{(2)} \in \mathbb{C}^{64 \times 1}$:

$$S'^{(2)} = [\ldots, -0.547-0.486j, 0.568+0.506j, 0.472+0.369j, 7.56+0.019j, -0.472+0.615j, -0.446+0.446j, \ldots]^T$$

The offset frequency domain signal $S'^{(i)}$ for other users (in this example, User 1) may be offset by different amounts, and for one of the users, the offset frequency domain signal $S'^{(i)}$ may not be offset (e.g., offset by zero [0] subcarriers). For example, $S^{(1)}$ may be shifted (e.g., to the right) by $NS^{(1)} = 0$ subcarriers to obtain the offset frequency domain signal $S'^{(1)}$ for User 1.

Step 7, Frequency Domain to Time Domain Transformation: $S'^{(2)}$ is transformed by an $N_{FFT}=64$ point IFFT to obtain the time-domain signal $s'^{(2)} \in \mathbb{C}^{64 \times 1}$:

$$s'^{(2)} = [0.124+0.015j, -0.038+0.118j, -0.111-0.057j, \ldots, -0.007+0.124j, -0.124+0.003j, -0.001-0.125j]^T$$

Step 8, Setting $N_{CP}=2$, add a cyclic prefix to obtain the baseband transmission signal $s'_{cp}{}^{(2)} \in \mathbb{C}^{66 \times 1}$:

$$s'_{cp}{}^{(2)} = [-0.124+0.003j, -0.001-0.125j, 0.124+0.015j, -0.038+0.118j, \ldots, -0.124+0.003j, -0.001-0.125j]^T$$

In the receiver:

Assuming there is no fading or noise in the channel, the signal $Y=S'$ is received in the frequency domain at the receiver, where $S'$ represents the frequency-domain signal of all users transmitted by the transmitter.

Step 9, Time Domain to Frequency Domain Transformation at the Receiver: Remove the cyclic prefix from the received signal and transform it through $N_{FFT}=64$ point IFFT to obtain the frequency-domain received signal $Y \in \mathbb{C}^{64 \times 1}$.

Step 10, User Separation: Separate the received signal $Y$ in the frequency domain for User 2 to obtain the received signal $Y^{(2)} \in \mathbb{C}^{64 \times 1}$ for User 2.

Step 11, Equalization Offset: Since the channel response $H = 1_{N_{FFT} \times 1}$ at this point, then we can conclude or assume that $\overline{Y}^{(2)} = Y^{(2)} = S'^{(2)}$. $\overline{Y}^{(2)}$ is then inversely offset (e.g., to the left) by $NS^{(2)}$ subcarriers to obtain $\tilde{Y}^{(2)}$:

$$\tilde{Y}^{(2)} = [7.56+0.019j, -0.472+0.615j, -0.446+0.446j, \ldots, -0.547-0.486j, 0.568+0.506j, 0.472+0.369j]^T$$

The inverse offset function is also performed for other users (in this example, User 1), but by the complementary amount in the offset preformed in the transmitter (e.g., Step 6 above). For example, $\overline{Y}^{(1)}$ may be shifted (e.g., to the left when the transmitter offsets to the right, or to the right when the transmitter offsets to the left, or not at all when the transmitter does not offset $\overline{Y}^{(1)}$) by $NS^{(1)}$ subcarriers to obtain the signal $\tilde{Y}^{(1)}$ for User 1.

Step 12, Obtain Detection Results (e.g., the transmitted bit sequence of User 2): Transform $\tilde{Y}^{(2)}$ obtained from Step 11 by an IFFT to the time domain, then phase-demodulate the resulting data sequence in the time domain using an arctangent function, and further transform it using an FFT to obtain data $\hat{X}^i$ for User 2 in the frequency domain. Finally, make a decision on the effective data of the i-th user to obtain the detection result $\hat{X}^{(2)}$ for that user:

$$\hat{X}^{(2)} = [0, 0.7+0.7j, 0.7+0.7j, -0.7-0.7j, 0.7+0.7j, 0.7-0.7j, -0.7-0.7j, -0.7-0.7j]^T$$

The present method and system reduces interference between users by applying different frequency domain offsets to different users. In this example, in step 2, if different users are mapped to different frequency domains, but no offset is applied in step 6, it represents a conventional uplink CE-OFDM multiple access method. From step 7, it can be observed that in the present invention, the DC components of the data and/or signals for different users are separated, resulting in less interference between users compared to traditional uplink CE-OFDM systems.

Finally, it should be noted that the above embodiments are only intended to illustrate the technical solution(s) of the present invention, and not to limit it. Although a detailed description of the present invention has been provided with reference to the aforementioned embodiments, those skilled in the art should understand that modifications can still be made to the technical solutions described in the aforementioned embodiments, or some technical features can be equivalently replaced. Such modifications or replacements do not depart from the essence of the technical solutions of the various embodiments of the present invention.

The above are only some embodiments of the present invention. For those skilled in the art, various modifications and improvements can be made without departing from the creative concept of the present invention, all of which are within the scope of protection of the present invention.

What is claimed is:

1. A method of constant envelope orthogonal frequency division multiple access (CE-OFDMA) based on constant envelope orthogonal frequency division multiplexing for multi-user access, where a number of subcarriers in the method is N, a total number of users is U, and an oversampling factor is Q, wherein each of the users occupies a subset of the subcarriers $N^i = N/U$, an effective number of the subcarriers is $N_c = N^i/2$, and a user identifier i is i=1, 2, ..., U, comprising:

using a transmitter, generating and transmitting a baseband transmission signal by:
  using a digital modulation module in the transmitter, mapping information bits of a user i to M-ary QAM modulation symbols, resulting in a modulation signal $X^i$ of length $N_c$, where $X^i = [0, X^i(1), X^i(2), \ldots, X^i(N_c-1)]^T$, M is a number of digital or binary bits transmitted per QAM modulation symbol, $X^i(q)$ represents the q-th symbol of the modulation signal $X^i$, and q=1, ..., N−1;
  using a mapping module in the transmitter, mapping or placing the modulation signal $X^i$ according to a preset conjugate symmetric format, resulting in a frequency-domain symbol $\tilde{X}^i$ of length $N_{FFT} = N \times Q$;
  using a frequency-domain to time-domain transformation module in the transmitter, generating a time-domain orthogonal frequency division multiplexing (OFDM) symbol $x^i$ for a user i among the users by performing an inverse fast Fourier transform (IFFT) on the frequency-domain symbol $\tilde{X}^i$, wherein the IFFT transform includes a number of points $N_{FFT}$;
  using a phase modulation module in the transmitter, performing a phase modulation on the time-domain OFDM symbol $x^i$ of the user i to obtain a discrete time-domain constant envelope OFDM (CE-OFDM) signal $s^i$, where the signal $s^i$ includes $N_{FFT}$ sampling points, a signal $s^i[n]$ at an n-th sampling point is given by a formula $s^i[n] = Ae^{j\phi^i}$, A is a carrier signal amplitude, $\phi^i$ is a phase and $\phi^i = 2\pi h C_N x^i[n]$, $2\pi h$ is a preset modulation index, $C_N$ is a normalization constant factor, and $x^i[n]$ is a signal at the n-th sampling point of the time-domain OFDM symbol $x^i$;
  using a time-domain to frequency-domain transformation module in the transmitter, performing an $N_{FFT}$-point FFT transform on $s^i$ to generate the frequency-domain signal $S^i$ for user i;
  using a frequency-domain shifting module in the transmitter, shifting the signal $S^i$ by $NS^i$ subcarriers to obtain a signal $S^{\prime i}$, where $NS^i$ is related to the subset of the subcarriers $N^i$ and the user identifier i;
  using the frequency-domain to time-domain transformation module, performing an $N_{FFT}$-point IFFT transform on the signal $S^{\prime i}$ to obtain a time-domain signal $s^{\prime i}$; and
  using a cyclic prefix module in the transmitter, adding a cyclic prefix of length $N_{CP}$ to the time-domain signal $s^{\prime i}$, resulting in the baseband transmission signal $s'_{cp}{}^i$;

using a receiver, receiving a signal through or from a channel and processing the signal to obtain detection results of or for each user, including:
  using a time-domain to frequency-domain transformation module in the receiver, removing the cyclic prefix from the signal, then performing an $N_{FFT}$-point FFT transform to obtain a frequency-domain received signal Y;
  using a user separation module in the receiver, separating the frequency-domain received signal Y to obtain a signal $Y^i$ for each user;
  using an equalization offset module in the receiver, equalizing the signal $Y^i$ to obtain an equalized symbol $\overline{Y}^i$, and then inverse-shifting the equalized symbol $\overline{Y}^i$ by $NS^i$ subcarriers to obtain a symbol $\tilde{Y}^i$;
  using a phase adjustment module in the receiver, performing a phase demodulation on the symbol $\tilde{Y}^i$ to produce a phase-demodulated symbol, and using a time-domain to frequency-domain transformation module in the receiver, processing the phase-demodulated symbol by an FFT transform to obtain the data $\hat{X}^i$ and transform the data $\hat{X}^i$ to the time domain, and
  using a demapping module in the receiver, demapping the data $\hat{X}^i$ to obtain effective data $\tilde{X}^i$ for user i, and using a decision module in the receiver, making a decision on the effective data $\tilde{X}^i$ to obtain one of the detection results $\hat{X}^i$ for user i.

2. The method as claimed in claim 1, wherein the frequency-domain symbol $\tilde{X}^i$ is defined as:

$$\tilde{X}^i = [0, X^i(1), X^i(2), \ldots, X^i(N_c-1), 0_{1\times(N/2-N_c)}, 0_{1\times N_{zp}}, 0,$$
$$0_{1\times(N/2-N_c)}, X^{i*}(N_c-1), \ldots, X^{i*}(2), X^{i*}(1)]^T$$

where $N_{zp} = N(Q-1)$, an asterisk (*) denotes a complex conjugate, and $0_{1\times N}$ represents a zero vector of size 1×N.

3. The method as claimed in claim 1, wherein the normalization constant factor $C_N = \sqrt{N_{FFT}{}^2/[(N-2)\sigma_I{}^2]}$, where $\sigma_I{}^2 = 2(M-1)/3$, and M represents an order of QAM modulation.

4. The method as claimed in claim 1, wherein the signal $S^{\prime i}$ is defined as:

$$S^{\prime i} = \begin{cases} [S^i(1), \ldots, S^i(N_{FFT})]^T, & i = 1 \\ [S^i(N_{FFT} - NS^i + 1), \ldots, S^i(N_{FFT}), \\ \quad S^i(1), \ldots, S^i(N_{FFT} - NS^i)]^T, & 2 \leq i \leq U \end{cases}$$

where $S^i(j)$ represents the signal $S^{\prime i}$ at given j-th sampling point of signal $S^i$.

5. The method as claimed in claim 1, wherein the baseband transmission signal sc is defined as:

$$s'_{cp}{}^i = [s^{\prime i}[N_{FFT} - N_{CP} + 1], \ldots, s^{\prime i}[N_{FFT}-1], s^{\prime i}[0], s^{\prime i}[1], \ldots, s^{\prime i}[N_{FFT}-1]]^T$$

where $s^{\prime i}[\bullet]$ represents the baseband transmission signal at a given sampling point of the baseband transmission signal $s'_{cp}{}^i$.

6. The method as claimed in claim 1, wherein the signal $Y^i$ for user i is defined as:

$$Y^i = \begin{cases} [Y(1), \ldots, Y(N_c), 0_{1\times(N_{FFT}-N^i)}, \\ \quad Y(N_{FFT}-N_c+1), \ldots, Y(N_{FFT})]^T, & i=1 \\ [0_{1\times N_c}, 0_{1\times K_i}, Y(K_i+N_c+1), \ldots, \\ \quad Y(K_{i+1}+N_c), 0_{1\times(N_{FFT}-N_c-K_{i+1})}]^T, & 2 \leq i \leq U \end{cases}$$

where $0_{1\times N}$ represents a zero vector of size 1×N, Y(•) represents the frequency-domain received signal Y at a given sampling point of the frequency-domain received signal Y, and $K_i=(i-2)N^i$.

7. The method as claimed in claim 1, wherein the symbol $\tilde{Y}^i$ is represented as:

$$\tilde{Y}^i = \begin{cases} [\bar{Y}^i(1), \ldots, \bar{Y}^i(N_{FFT})]^T, & i=1 \\ [\bar{Y}^i(NS^i+1), \ldots, \bar{Y}^i(N_{FFT}), \bar{Y}^i(1), \ldots, \bar{Y}^i(NS^i)], & 2 \leq i \leq U \end{cases}$$

where $\bar{Y}^i$(•) represents the symbol at a given sampling point of the equalized symbol $\bar{Y}^i$ for user i.

8. The method as claimed in claim 1, wherein $NS^i$ is a result of a mathematical operation performed on the subset of the subcarriers $N^i$ and the user identifier i.

9. The method as claimed in claim 8, wherein $NS^i = N^i(i-1)$.

10. A constant envelope orthogonal frequency division multiple access (CE-OFDMA) communication system having multi-user access, where a number of subcarriers in the system is N, a total number of users is U, and an oversampling factor is Q, wherein each of the users occupies a subset of the subcarriers $N^i=N/U$, an effective number of the subcarriers is $N_c=N^i/2$, and a user identifier i is i=1, 2, . . . , U, comprising:
- a transmitter configured to generate and transmit a baseband transmission signal, the transmitter comprising:
  - a digital modulation module configured to map information bits of a user i to M-ary QAM modulation symbols, resulting in a modulation signal $X^i$ of length $N_c$, where $X^i=[0, X^i(1), X^i(2), \ldots, X^i(N_c-1)]^T$, M is a number of digital or binary bits transmitted per QAM modulation symbol, $X^i(q)$ represents the q-th symbol of the modulation signal $X^i$, and q=1, . . . , $N_c-1$;
  - a mapping module configured to map or place the modulation signal $X^i$ according to a preset conjugate symmetric format, resulting in a frequency-domain symbol $\tilde{X}^i$ of length $N_{FFT}=N\times Q$;
  - a frequency-domain to time-domain transformation module configured to generate a time-domain orthogonal frequency division multiplexing (OFDM) symbol $x^i$ for a user i among the users by performing an inverse fast Fourier transform (IFFT) on the frequency-domain symbol $\tilde{X}^i$, wherein the IFFT transform includes a number of points $N_{FFT}$;
  - a phase modulation module configured to perform a phase modulation on the time-domain OFDM symbol $x^i$ of the user i to obtain a discrete time-domain constant envelope OFDM (CE-OFDM) signal $s^i$, where the signal $s^i$ includes $N_{FFT}$ sampling points, a signal $s^i[n]$ at an n-th sampling point is given by a formula $s^i[n]=Ae^{j\varphi^i}$, A is a carrier signal amplitude, $\varphi^i$ is a phase and $\varphi^i=2\pi h C_N x^i[n]$, $2\pi h$ is a preset modulation index, $C_N$ is a normalization constant factor, and $x^i[n]$ is a signal at the n-th sampling point of the time-domain OFDM symbol $x^i$;
  - a time-domain to frequency-domain transformation module configured to perform an $N_{FFT}$-point FFT transform on $s^i$ to generate the frequency-domain signal $S^i$ for user I;
  - a frequency-domain shifting module configured to shift the signal $S^i$ by $NS^i$ subcarriers to obtain a signal $S'^i$, where $NS^i$ is related to the subset of the subcarriers $N^i$ and the user identifier i, wherein the frequency-domain to time-domain transformation module is further configured to perform an $N_{FFT}$-point IFFT transform on the signal $S'^i$ to obtain a time-domain signal $s'^i$; and
  - a cyclic prefix module configured to add a cyclic prefix of length $N_{CP}$ to the time-domain signal $s'^i$, resulting in the baseband transmission signal $s'_{cp}{}^i$; and
- a receiver configured to receive a signal through or from a channel and process the signal to obtain detection results of or for each user, including:
  - a time-domain to frequency-domain transformation module configured to remove the cyclic prefix from the signal, then perform an $N_{FFT}$-point FFT transform to obtain a frequency-domain received signal Y;
  - a user separation module configured to separate the frequency-domain received signal Y to obtain a signal $Y^i$ for each user;
  - an equalization offset module configured to equalize the signal $Y^i$ to obtain an equalized symbol $\bar{Y}^i$, and then inverse-shift the equalized symbol $\bar{Y}^i$ by $NS^i$ subcarriers to obtain a symbol $\tilde{Y}^i$;
  - a phase adjustment module configured to perform a phase demodulation on the symbol $\tilde{Y}^i$ to produce a phase-demodulated symbol;
  - a time-domain to frequency-domain transformation module configured to process the phase-demodulated symbol by an FFT transform to obtain the data $\hat{X}^i$ and transform the data $\hat{X}^i$ to the time domain;
  - a demapping module configured to demap the data $\hat{X}^i$ to obtain effective data $\tilde{X}^i$ for user i; and
  - a decision module configured to make a decision on the effective data $\tilde{X}^i$ to obtain one of the detection results $\hat{X}^i$ for user i.

11. The system as claimed in claim 10, wherein the frequency-domain symbol $\tilde{X}^i$ is defined as:

$$\tilde{X}_i=[0,X^i(1),X^i(2),\ldots,X^i(N_c-1),0_{1\times(N/2-N_c)},0_{1\times N_{zp}},0,\\ 0_{1\times(N/2-N_c)},X^{i*}(N_c-1),\ldots,X^{i*}(2),X^{i*}(1)]^T$$

where $N_{zp}=N(Q-1)$, an asterisk (*) denotes a complex conjugate, and $0_{1\times N}$ represents a zero vector of size 1×N.

12. The system as claimed in claim 10, wherein the normalization constant factor $C_N=\sqrt{N_{FFT}^2/[(N-2)\sigma_I^2]}$, where $\sigma_I^2=2(M-1)/3$, and M represents an order of QAM modulation.

13. The system as claimed in claim 10, wherein the signal $S'^i$ is defined as:

$$S'^i = \begin{cases} [S^i(1), \ldots, S^i(N_{FFT})]^T, & i=1 \\ [S^i(N_{FFT}-NS^i+1), \ldots, S^i(N_{FFT}), \\ \quad S^i(1), \ldots, S^i(N_{FFT}-NS^i)]^T, & 2 \leq i \leq U \end{cases}$$

where $S^i(j)$ represents the signal $S^{'i}$ at given j-th sampling point of signal $S^i$.

14. The system as claimed in claim 10, wherein the baseband transmission signal $s'^i_{cp}$ is defined as:

$$s'^i_{cp}=[s^{'i}[N_{FFT}-N_{CP}+1], \ldots, s^{'i}[N_{FFT}-1], s^{'i}[0], s^{'i}[1], \ldots, s^{'i}[N_{FFT}-1]]^T$$

where $s^{'i}[\bullet]$ represents the baseband transmission signal at a given sampling point of the baseband transmission signal $s'^i_{cp}$.

15. The system as claimed in claim 10, wherein the signal $Y^i$ for user i is defined as:

$$Y^i = \begin{cases} [Y(1), \ldots, Y(N_c), 0_{1\times(N_{FFT}-N^i)}, \\ Y(N_{FFT}-N_c+1), \ldots, Y(N_{FFT})]^T, & i=1 \\ [0_{1\times N_c}, 0_{1\times K_i}, Y(K_i+N_c+1), \ldots, \\ Y(K_{i+1}+N_c), 0_{1\times(N_{FFT}-N_c-K_{i+1})}]^T, & 2 \leq i \leq U \end{cases}$$

where $0_{1\times N}$ represents a zero vector of size 1×N, $Y(\bullet)$ represents the frequency-domain received signal Y at a given sampling point of the frequency-domain received signal Y, and $K_i=(i-2)N^i$.

16. The system as claimed in claim 10, wherein the symbol $\tilde{Y}^i$ is represented as:

$$\tilde{Y}^i = \begin{cases} [\overline{Y}^i(1), \ldots, \overline{Y}^i(N_{FFT})]^T, & i=1 \\ [\overline{Y}^i(NS^i+1), \ldots, \overline{Y}^i(N_{FFT}), \overline{Y}^i(1), \ldots, \overline{Y}^i(NS^i)], & 2 \leq i \leq U \end{cases}$$

where $\overline{Y}^i(\bullet)$ represents the symbol at a given sampling point of the equalized symbol $\overline{Y}^i$ for user i.

17. The system as claimed in claim 10, comprising a mathematical operator configured to perform a mathematical operation on the subset of the subcarriers $N^i$ and the user identifier i to obtain $NS^i$.

18. The system as claimed in claim 17, wherein the mathematical operator comprises (i) an adder or subtractor configured to reduce the user identifier i by 1, and (ii) a multiplier configured to multiply the subcarriers $N^i$ by the user identifier i minus 1.

* * * * *